C. F. McMULLEN.
GRASSHOPPER DESTROYER.
APPLICATION FILED NOV. 26, 1910.
1,014,890.
Patented Jan. 16, 1912.
2 SHEETS—SHEET 1.
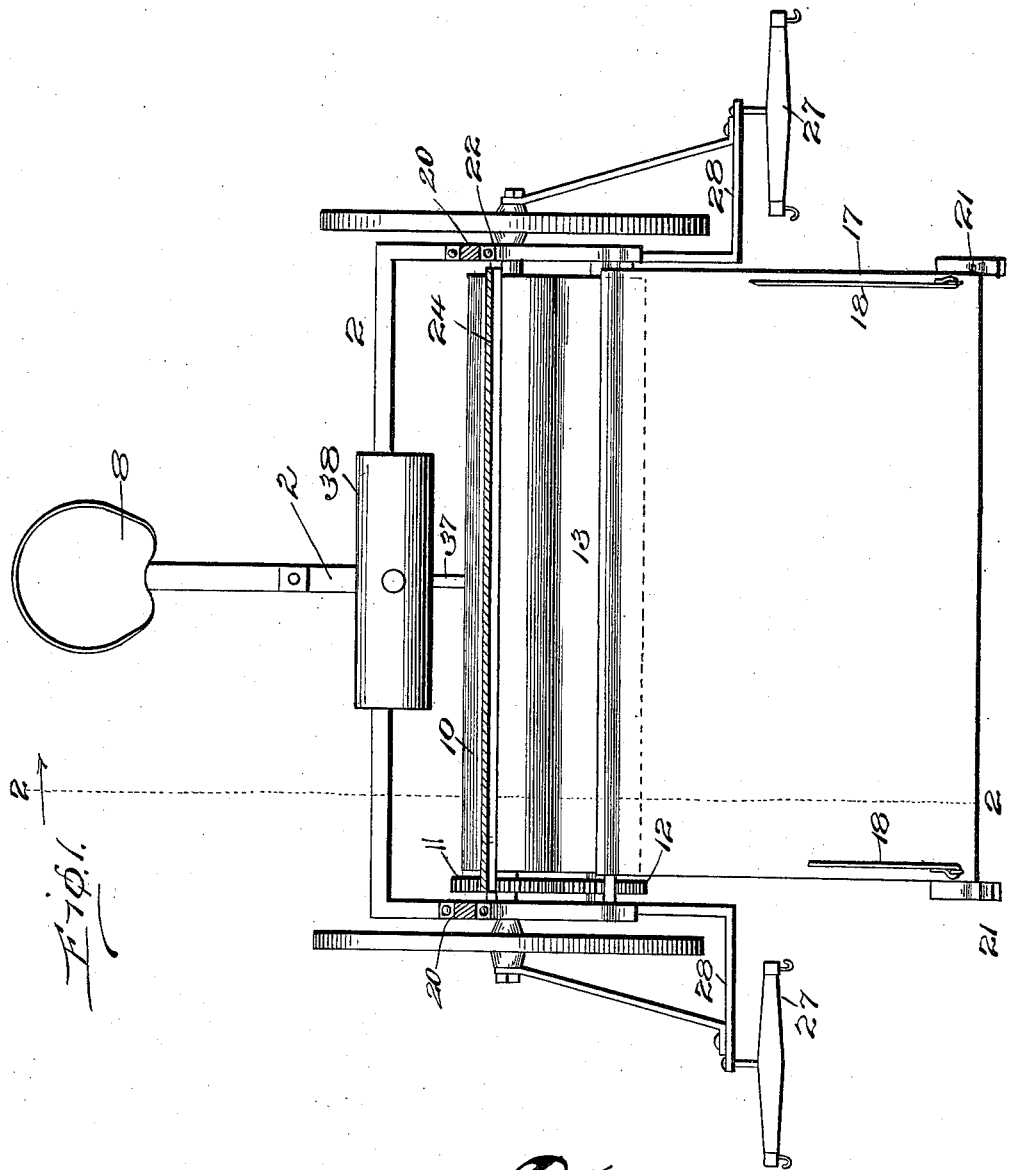

C. F. McMULLEN.
GRASSHOPPER DESTROYER.
APPLICATION FILED NOV. 26, 1910.
1,014,890.
Patented Jan. 16, 1912.
2 SHEETS—SHEET 2.
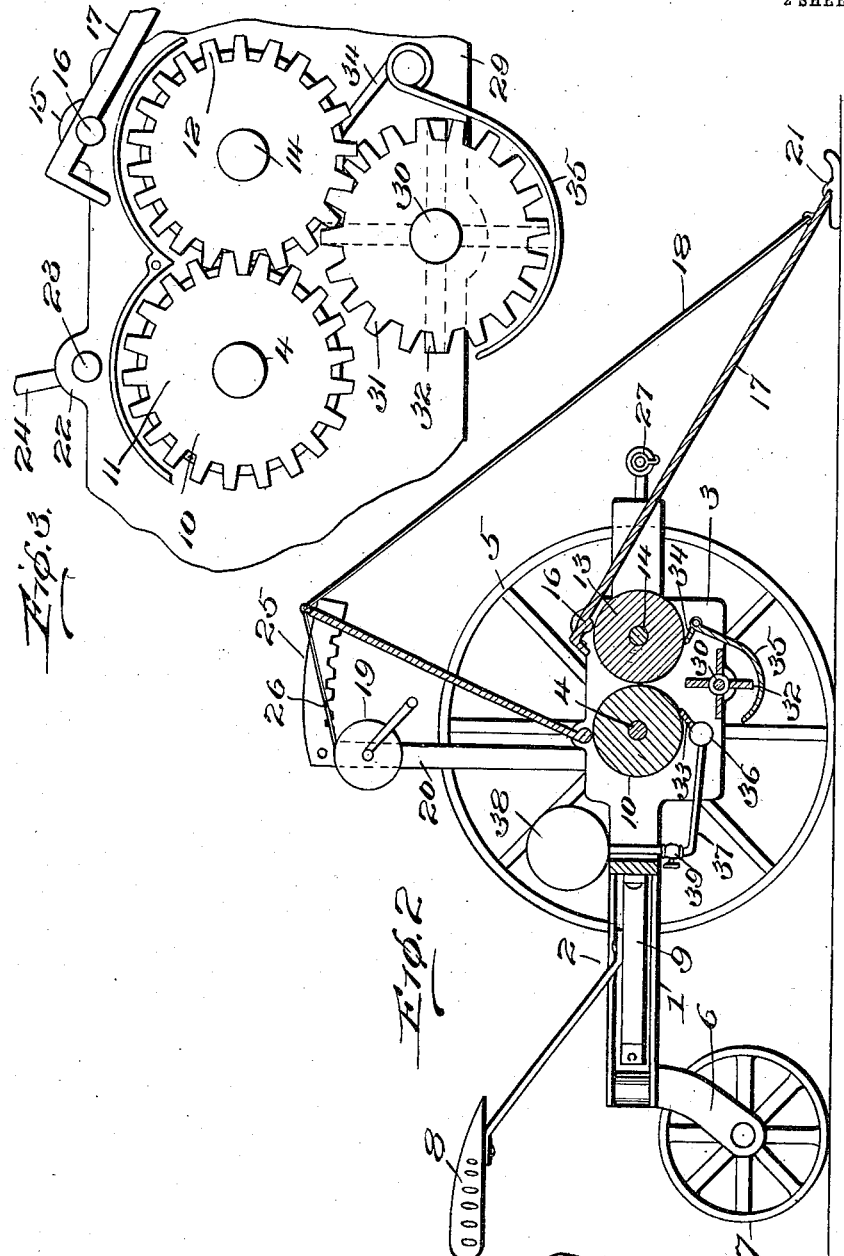

UNITED STATES PATENT OFFICE.

CHARLES F. McMULLEN, OF FORT LUPTON, COLORADO.

GRASSHOPPER-DESTROYER.

1,014,890.          Specification of Letters Patent.      Patented Jan. 16, 1912.

Application filed November 26, 1910. Serial No. 594,378.

*To all whom it may concern:*

Be it known that I, CHARLES F. McMULLEN, a citizen of the United States, residing at Fort Lupton, in the county of Weld and State of Colorado, have invented certain new and useful Improvements in Grasshopper-Destroyers, of which the following is a specification.

My invention relates to improvements in grasshopper destroyers, and has particular reference to a machine adapted to both mechanically destroy the grasshoppers with which it contacts and to spread poison for the other grasshoppers to kill the latter.

The leading object of my invention is the provision of an improved machine which will serve to catch the grasshoppers as they fly through the air toward the machine and which will positively destroy the same and will spread the bodies thereof evenly over the field.

A further object of the invention is the provision in conjunction with a mechanical grasshopper catcher and destroyer of means for poisoning the said dead bodies to destroy the other grasshoppers when they follow their common custom of eating the dead bodies of the rest of the swarm.

Another object of the invention is the provision of a machine adapted to be moved through a field infested with grass-hoppers which will serve to catch a portion of said grasshoppers and pulverize the same and which will then poison the crushed mass to provide an acceptable poisoned food for the remaining grasshoppers which will not be palatable to or attract cattle or other stock as most grasshopper poisons now in use are liable to do.

To attain the desired objects, my machine comprises a frame having supporting wheels, crushing mechanism and poisoning and mixing and distributing mechanism also driven by the wheels, and means mounted on the frame for catching and feeding the grasshoppers into the mechanism, the invention further residing in the novel features of construction and combination and arrangement of parts for service substantially as described and as illustrated in the accompanying drawings.

Figure 1 represents a top plan view of my complete machine. Fig. 2 represents a vertical sectional view thereof on line 2—2 of Fig. 1, and, Fig. 3 represents an enlarged detailed view of the transmission gearing with the protecting end plate therefor removed.

In the drawings, in which similar characters of reference are employed to denote corresponding parts in the several views, the numeral 1 denotes the frame bars providing the rectangular lower frame, while supported thereabove by the spacing blocks are the bars 2 providing a second frame, while a double bearing 3 is interposed and secured between the forward ends of said frames 1 and 2 on each side. Journaled in one portion of each of said bearings and extending across the machine is the axle shaft 4 having secured on each end the large supporting wheels 5, while pivoted to the rear of the frames 1 and 2 is the bracket 6 in which is mounted the smaller or caster wheel 7 for balancing the machine, a seat 8 being supported by the flat spring bar connected to the extension 9.

Mounted on the shaft 4 is the crushing roller 10 having secured to one end the gear 11 which is in mesh with the gear 12 of the roller 13 which has its shaft 14 journaled in the other half of the double bearing 3, and it will be understood that while the roller 10 is driven forward as the machine moves the gears will drive the roller 13 in a reverse direction and said rollers will draw down between and crush any small substances resting on their upper surface. Projecting upward from the sides of the frame bars 2 just forward of the double bearing are the ears 15, while pivotally secured to said ears are the pintles 16 of the front apron 17 which is adjustably supported by the cable 18, said cable being adapted to be wound on the drum 19 carried by the extension 20 rising vertically from the frame, the winding of the cable raising the apron as desired. Carried by the lower edge of the apron are the shoes 21 for supporting the apron near the ground without being worn on the edge and causing it to ride over stones and other impediments.

A second set of ears 22 are located on the bars 2 just rearward of the axle 4, and pivotally mounted in said ears are the pintles 23 of the upright apron 24 held in adjusted position by engagement with the segment 25 pivoted to the extension 20 and having notches 26 for engaging the upper edge of the apron.

From the foregoing description taken in connection with the drawings it will be seen that I have provided a machine having adjustable aprons making an obtuse angle with each other and having the vertex of said angle over the crushing rollers, the aprons thus forming a sort of funnel to gather in the hoppers flying in the air or rising from the ground in front of the machine and causing them to collect on the rollers, which draw them down and crush them into a lifeless mass, swingle-trees 27 being secured to the brackets 28 projecting laterally from the frame for the attachment of draft animals to move the machine forward.

Depending from the double bearing 3 is a single bearing 29 in which is journaled the shaft 30 provided with gears 31 in mesh with and driven by the gears 12, while extending radially from the shaft are the blades 32 which in their upward movement are under the space between the rollers 10 and 13 and receive the crushed mass therefrom, a scraper 33 scraping the mass from the roller 10 onto said blades, while a scraper 34 performs a similar service for the roller 13, the material loosened by said second scraper striking the blades on their downward movement. Depending from the front of the frame and curving rearwardly under the shaft 30 with its blades is the trough 35 which retains the material on the blades until it has passed almost around the shaft, when the blades push it from the trough onto the fields in the place formerly occupied by the live grasshoppers. Located near the upper forward edge of the trough is a perforated transversely disposed pipe or sprinkler 36 connected by the pipe 37 with the supply tank 38 carried on the rear of the frame, said tank containing a supply of suitable poisonous fluid for poisoning the crushed mass in order that the other grasshoppers may be poisoned by eating the same, a portion of the fluid being absorbed as it falls on the mass while the rest falls into the trough and soaks into said mass as it passes through the lower portion of the trough, a valve 39 regulating the flow of the fluid.

From the foregoing description taken in connection with the drawings the construction and operation of my improved grasshopper destroyer will be readily understood and its advantages fully appreciated, and it will be seen that I have provided a machine which will catch a portion of the swarm of grasshoppers, crush the same, inject poison into the mass, and spread the same over the field infested by the insects to poison the remainder, and that I have provided a simple, durable and efficient machine for the desired purpose which will commend itself to the western farmers afflicted with this plague of insects as highly desirable, while to prevent clogging of the gears by the bodies of the hoppers I may inclose the said gears.

I claim:

1. A grasshopper destroyer, comprising a frame, catching and crushing mechanism mounted thereon, and means for injecting poison into the crushed mass.

2. A grasshopper destroyer, comprising a frame, an axle-shaft journaled therein, supporting wheels mounted on said shaft and driving the same, crusher rollers driven by the shaft, a catcher discharging onto the rollers, and means for poisoning the crushed mass.

3. A grasshopper destroyer, comprising a frame, an axle-shaft journaled therein, supporting wheels secured thereon for driving the same, a roller mounted on the shaft, a gear on the shaft, a second roller journaled in the frame and having a gear in mesh with the gear on the shaft, means for feeding grasshoppers onto the rollers, a mixer for receiving the grasshoppers after they are crushed between the rollers, a gear on the mixer in mesh with and driven by the gear on the roller, a guiding trough extending partially around the mixer, and means for poisoning the crushed mass before it leaves the machine.

In testimony whereof I affix my signature, in presence of two witnesses.

CHARLES F. McMULLEN.

Witnesses:
H. M. SIEMAN,
DON CRAMER.

---

Copies of this patent may be obtained for five cents each, by addressing the "Commissioner of Patents, Washington, D. C."